United States Patent Office 3,513,004
Patented May 19, 1970

3,513,004
$La_2O_3$-$TiO_2$-$Ta_2O_5$-$ZrO_2$-$BaO$-$B_2O_3$-$SiO_2$
OPTICAL GLASS
Jaroslaw Kohut and Lawrence V. Pfaender, Toledo, Ohio, assignors to Owens-Illinois, Inc., a corporation of Ohio
No Drawing. Filed Apr. 11, 1966, Ser. No. 541,490
Int. Cl. C03c 3/08
U.S. Cl. 106—54         10 Claims

ABSTRACT OF THE DISCLOSURE

An optical glass composition which is productive of a glass exhibiting high resistance to thermal crystallization and which is tailored to provide in conjunction therewith such additional physical properties as chemical durability, a coefficient of thermal expansion of from 80 to $100 \times 10^{-7}$ in the temperature range of 0–425° C., and an index of refraction ($n_d$) of from 1.77 to 1.90. The glass composition consists of at least seven essential oxides which together constitute not less than 64% by weight of the total composition. The seven essential oxides on a theoretical oxide basis are $La_2O_3$, $TiO_2$, $BaO$, $B_2O_3$, $SiO_2$, $Ta_2O_5$ and $ZrO_2$, which with other specific beneficial, but non-essential, oxide constituents are present together in the following relative ranges of percents by weight:

| Constituent oxide | Percent by weight |
|---|---|
| $La_2O_3$ | 18–29 |
| $TiO_2$ | 8–14 |
| $BaO$ | 22–30 |
| $B_2O_3$ | 7–15 |
| $SiO_2$ | 5–15 |
| $Ta_2O_5$ | 2–5 |
| $ZrO_2$ | 2–9 |
| $K_2O$ | 0–4 |
| $Na_2O$ | 0–4 |
| $Al_2O_3$ | 0–4 |
| $Li_2O$ | 0–1 |
| $Nb_2O_3$ | 0–5 |
| $WO_3$ | 0–10 |

The present invention pertains to novel glass compositions and, more particularly, to optical glasses possessing highly desirable physical properties.

Optical glasses are generally employed by industry and science for many purposes. Among the purposes for which optical glass compositions are employed are mosaics for image intensifier tubes, the manufacture of fiber optics, optical computers, flexible fiber optic cystoscopes, cathode-ray face plates and the like. Other purposes that use optical glass compositions are items of commerce such as lens, instruments for research and general laboratory work, astronomical disks and the like. The optical glasses used for the above-mentioned purposes should exhibit stable characteristics, such as being essentially free from devitrification for, in the manufacture of fiber optic systems, as mentioned in the former group of purposes, it is often necessary to reheat and reform the optical glass before the final product is effected. In the fabrication of the items of commerce, as mentioned in the latter group of purposes, the optical glass item is often subjected to the slight thermal effects produced by grinding, regrinding, polishing and repolishing as may be necessary to effect the desired final product. Also, the optical glasses used for the above-mentioned purposes require a glass composition with good chemical durability for acids and alkali, they must also possess physical and chemical homogeneity and a high order of freedom from imperfections like cords, strains, seeds, bubbles and the like. The optical glass composition should also possess a desirable index of refraction and good working characteristics for the fabrication of said scientific and industrial equipment. For some scientific or commercial application, such as in image intensifier systems, a desirable index is of import, as the higher the index of refraction, the greater the figure of merit.

Attempts have been made by the prior art to produce optical glass compositions with desirable characteristics as disclosed, for example, in U.S. Pat. Re. 21,175 and 2,206,081. However, certain of the compositions of Re. 21,175 as reported in U.S. Pat. 3,150,990 are unstable and they tend to have a relatively high dispersion and a yellow-brown color. Other prior art attempts to produce optical glass involved the use of thorium, but, thorium is radioactive and the manufacture of glasses containing this element may therefore involve exposures to health-hazards. Still other attempts to effect optical glasses have involved the application of considerable amounts of rare earths, but, the optical glasses made in this fashion incline toward unstability as exemplified by devitrification.

It will be appreciated by those versed in the art that if optical glass compositions are compounded that are essentially very stable for reheating and reforming processes as employed for the manufacture of fiber optic systems, such optical glass would represent a useful contribution to the art. Likewise, it will be further appreciated by those skilled in the art that if optical glasses are compounded essentially-free from radioactive substances, with a high order of freedom from imperfections and with a desirable index of refraction, said optical glasses would have a definite commercial value and a positive use for industry and science.

Accordingly, it is an object of the present invention to provide novel optical glass compositions.

Another object of the present invention is to provide optical glass compositions suitable for the manufacture of commercial and scientific ware.

A further object of the present invention is to provide optical glass compositions that are essentially free from seeds, cords, blisters and the like.

A still further object of the instant invention is to provide optical glasses that are essentially very stable for the fabrication and manufacture of optical fibers which can be subsequently sintered into a vacuum tight array.

A still further object of the present invention is to provide optical glasses that are essentially very stable for reheating and reforming for the manufacture of fiber optic core billets which can be subsequently fabricated into a flexible fiber optic system or sintered into a rigid vacuum tight array.

Yet a still further object of the present invention is to provide an optical glass with a high index of refraction.

Another object of the present invention is to provide an optical glass with a high index of refraction while maintaining the desired stable characteristics of the optical glass compositions and said glass being essentially-free from devitrification and essentially-free from crystallization and wherein said glass possesses desirable characteristics for fabrication into fiber optics and the like by conventional forming techniques.

Yet a further object of the present invention is to provide glass compositions that are essentially free from thorium and other radioactive substances while still maintaining a high index of refraction.

These and other objects and advantages of the invention will become apparent to those skilled in the art from the following detailed description and the accompanying claims.

In obtaining the novel optical glasses of the instant invention, it has now been found that optical glasses with a high refractive index and essentially free from imperfections can be made by intimately blending various amounts of alkali, alkaline earth, rare earth and other oxides into an optical glass possessing optical homogeneity. The present invention provides optical glasses comprising about 5 to about 15 weight percent $SiO_2$, about 7 to about 15 weight percent $B_2O_3$, about 0 to about 4 weight percent CaO, about 22 to about 30 weight percent BaO, about 2 to about 5 weight percent $Ta_2O_5$, about 18 to about 29 weight percent $La_2O_3$, about 8 to about 14 weight percent $TiO_2$, about 2 to about 9 weight percent $ZrO_2$, about 0 to about 4 weight percent $K_2O$, about 0 to about 4 weight percent $Na_2O$, about 0 to about 4 weight percent $Al_2O_3$, and about 0 to 1.0 weight percent $Li_2O$; an optical glass comprising about 5 to about 15 weight percent $SiO_2$, about 7 to about 15 weight percent $B_2O_3$, about 0 to about 4 weight percent CaO, about 22 to about 30 weight percent BaO, about 2 to about 5 weight percent $Ta_2O_5$, about 18 to about 29 weight percent $La_2O_3$, about 8 to about 14 weight percent $TiO_2$, about 2 to about 9 weight percent $ZrO_2$, about 0 to about 4 weight percent $K_2O$, about 0 to about 4 weight percent $Na_2O$, about 0 to about 4 weight percent $Al_2O_3$, about 0 to about 1.0 weight percent $Li_2O$, about 1 to about 5 weight percent $Nb_2O_3$, and about 1 to about 10 weight percent $WO_3$; and a glass composition comprising about 5 to 15 weight percent $SiO_2$, about 7 to about 15 weight percent $B_2O_3$, about 0 to about 4 weight percent CaO, about 22 to about 30 weight percent BaO, about 2 to about 5 weight percent $Ta_2O_5$, about 18 to about 29 weight percent $La_2O_3$, about 8 to about 14 weight percent $TiO_2$, about 2 to about 9 weight percent $ZrO_2$, about 1 to about 5 weight percent $Nb_2O_3$, about 0 to about 10 weight percent $WO_3$, and about 0 to about 1 weight percent $Li_2O$.

Exemplary of optical glass compositions according to the mode and manner of the present invention are an optical glass comprising about 14 weight percent $SiO_2$, about 11 weight percent $B_2O_3$, about 2 weight percent CaO, about 29 weight percent BaO, about 3 weight percent $Ta_2O_5$, about 22 weight percent $La_2O_3$ about 9 weight percent $TiO_2$, about 6 weight percent $ZrO_2$, about 1 weight percent $Al_2O_3$, about 0.2 weight percent $Li_2O$, and about 3 weight percent $K_2O$; an optical glass comprising about 8 weight percent $SiO_2$, about 11 weight percent $B_2O_3$, about 2.00 weight percent CaO, about 29 weight percent BaO, about 4 weight percent $Ta_2O_5$, about 23 weight percent $La_2O_3$, about 12 weight percent $TiO_2$, about 5 weight percent $ZrO_2$, about 3 weight percent $Nb_2O_3$, and about 3 weight percent $WO_3$; an optical glass composition comprising about 8 weight percent $SiO_2$, about 11 weight percent $B_2O_3$, about 29 weight percent BaO, about 5 weight percent $Ta_2O_5$, about 24 weight percent $La_2O_3$, about 12 weight percent $TiO_2$, about 3 weight percent $ZrO_2$, about 5 weight percent $WO_3$, and about 3 weight percent $Nb_2O_3$.

Other optical glass compositions exemplary of subject glasses are glasses comprising about 8 weight percent $SiO_2$, about 11 weight percent $B_2O_3$, about 1 weight percent CaO, about 29 weight percent BaO, about 4 weight percent $Ta_2O_5$, about 24 weight percent $La_2O_3$, about 12 weight percent $TiO_2$, about 5 weight percent $ZrO_2$, about 3 weight percent $Nb_2O_3$ and about 3 weight percent $WO_3$; an optical glass comprising about 8 weight percent $SiO_2$, about 11 weight percent $B_2O_3$, about 29 weight percent BaO, about 5 weight percent $Ta_2O_5$, about 24 weight percent $La_2O_3$, about 12 weight percent $TiO_2$, about 8 weight percent $ZrO_2$, and about 3 weight percent $Nb_2O_3$; an optical glass comprising 8 weight percent $SiO_2$, about 11 weight percent $B_2O_3$, about 29 weight percent BaO, about 5 weight percent $Ta_2O_5$, about 24 weight percent $La_2O_3$, about 11 weight percent $TiO_2$, about 8 weight percent $ZrO_2$, about 1 weight percent $Li_2O$, and about 3 weight percent $Nb_2O_3$; and, an optical glass consisting of 8 weight percent $SiO_2$, about 11 weight percent $B_2O_3$, about 2 weight percent CaO, about 29 weight percent BaO, about 3 weight percent $Ta_2O_5$, about 24 weight percent $La_2O_3$, about 12 weight percent $TiO_2$, about 8 weight percent $ZrO_2$, and about 3 weight percent $Nb_2O_3$.

In preparing glasses of the above compositional ranges the batch ingredients are intimately mixed by hand or in a suitable blender and heated to such temperatures so that all substances are present in the liquidus state, and, thereby, enabling the formation of a glass with physical and chemical homogeneity from the homogeneous melt. Generally, the subject glasses thus formed have coefficients of thermal expansion of about 80 to about $100 \times 10^{-7}$ (0–425° C.) with the now-preferred range of about 90 to $95 \times 10^{-7}$ (0–425° C.), and a refractive index for the D line of about 1.77 to about 1.90, with the now-preferred range of about 1.77 to 1.80 and about 1.85 to 1.90.

The batch ingredients employed for the instant glass compositions are generally of the highest purity, and they are intimately mixed and then melted in a crucible. The crucible employed herein was platinum. The melting temperature for the subject compositions is generally in the range of about 2550 to about 2850° F. with the now generally employed range of about 2700 to about 2850° F. The crucibles were heated in an electric furnace and in an air atmosphere. The average glass melting time was about 4 to about 8 hours, and the glass compositions were melted with constant stirring. Other glasses were prepared wherein the batch was melted over night, that is, for about 20 hours.

The commercially-available batch materials employed for preparing the glasses of the instant invention were of the highest purity and were generally selected from the following: Amersil sand, boric anhydride, calcium carbonate, barium carbonate, tantalum oxide, lanthanum oxide, titanium oxide, zirconium oxide, potassium carbonate, lithium carbonate, columbium oxide, tungstic acid and the like. While these are exemplary of the ingredients employed, other functionally equivalent reagents may be used for the glass compositions.

Batch constituents for preparing novel representative glasses of the instant invention are set forth in the table below, but these examples are not to be construed as limiting, as other suitable batch constituents for producing the glasses of the present invention may be employed within the manner and spirit of the invention.

TABLE I

| Example 1 | Example 2 |
|---|---|
| Batch ingredients, grams: | Theoretical composition, percent by weight: |
| Amersil sand, 676.5 | $SiO_2$, 13.53. |
| Titanium oxide, 444 | $TiO_2$, 8.88. |
| Zirconium oxide, 301 | $ZrO_2$, 6.02. |
| Barium carbonate, 1858 | BaO, 28.88. |
| Boric anhydride, 561.4 | $B_2O_3$, 11.06. |
| Tantalum oxide, 165 | $Ta_2O_5$, 3.27. |
| Lanthanum oxide, 1091 | $La_2O_3$, 21.73. |
| Calcium carbonate, 191.1 | CaO, 2.14. |
| R. R. Alundum, 50.1 | $Al_2O_3$, 1.00. |
| Potassium carbonate, 243.7 | $K_2O$, 3.30. |
| Lithium carbonate, 24.7 | $Li_2O$, 0.20. |

The ingredients of the above examples were thoroughly blended and intimately melted in a platinum crucible at 2700 to 2850° F. in an air atmosphere for about 7 to 8 hours. The theoretical composition, for the vitreous glass, expressed as percent by weight for the ingredients of Example 1, are set forth in Example 2.

In Table II, immediately below, is set forth the batch constituents, Example 3, and the theoretical composition, Example 4, for another optical glass prepared according to the instant invention.

TABLE II

| Example 1 | Example 2 |
|---|---|
| Ingredients, grams: | Theoretical composition, percent by weight: |
| Amersil sand, 400 | $SiO_2$, 8.00. |
| Columbium oxide, 150.2 | $Nb_2O_3$, 3.00. |
| Titanium dioxide, 600.4 | $TiO_2$, 12.00. |
| Zirconium oxide, 250.2 | $ZrO_2$, 5.00. |
| Barium carbonate, 1885.1 | BaO, 29.00. |
| Boric anhydride, 548.2 | $B_2O_3$, 10.80. |
| Tantalum oxide, 186.7 | $Ta_2O_5$, 3.70. |
| Lanthanum oxide, 1180.9 | $La_2O_3$, 23.50. |
| Tungstic acid, 162.2 | $WO_3$, 3.00. |
| Calcium carbonate, 178.6 | CaO, 2.00. |

In the tables set forth hereinafter, Table III and Table IV, are listed the theoretical composition and physical properties for novel optical glass compositions made according to the present invention.

TABLE III

| | Theoretical composition | | | |
|---|---|---|---|---|
| Example | 5 | 6 | 7 | 8 |
| Ingredients: | | | | |
| $SiO_2$ | 13.43 | 13.53 | 135.3 | 13.53 |
| $B_2O_3$ | 11.06 | 11.06 | 11.16 | 11.06 |
| CaO | 2.14 | 2.14 | 2.14 | 2.14 |
| BaO | 28.89 | 28.89 | 28.88 | 28.88 |
| $Ta_2O_5$ | 3.27 | 3.27 | 3.27 | 3.27 |
| $La_2O_3$ | 21.72 | 21.73 | 21.73 | 21.73 |
| $TiO_2$ | 8.87 | 8.87 | 8.87 | 8.87 |
| $ZrO_2$ | 6.02 | 6.02 | 6.02 | 6.02 |
| $K_2O$ | 3.30 | 3.00 | 3.30 | 3.30 |
| $Li_2O$ | 0.30 | 0.50 | 0.10 | 0.20 |
| $Al_2O_3$ | 1.00 | 1.00 | 1.00 | 1.00 |
| | Physical properties | | | |
| Fiber softening point, °C | 725 | 726 | 749 | 732 |
| Annealing point, °C | 618 | 617 | 638 | 625 |
| Strain point, °C | 588 | 588 | 608 | 597 |
| Thermal expansion, $\times 10^{-7}$ (0–425° C.) | 95.4 | 95.0 | 93.9 | 95.4 |
| Index of refraction | 1.7720 | 1.7779 | 1.7715 | 1.7718 |

TABLE V.—CHEMICAL AND PHYSICAL PROPERTIES OF A FIBER OPTIC CORE GLASS

| Example | 16 | 17 | 18 | 19 | 20 |
|---|---|---|---|---|---|
| Theoretical composition, percent by weight. | \multicolumn{5}{l|}{$SiO_2$—13.53, $B_2O_3$—11.06, CaO—2.14, BaO—28.88, $Ta_2O_5$—3.27, $La_2O_3$—21.73, $TiO_2$—8.87, $ZrO_2$—6.02, $K_2O$—3.30, $Al_2O_3$—1.00, $Li_2O$—0.20.} | | | | |
| Fiber softening point, °C | 731 | 734 | 733 | 733 | 728 |
| Annealing point, °C | 625 | 627 | 628 | 620 | 620 |
| Strain point, °C | 598 | 599 | 600 | 588 | 588 |
| Coefficient of expansion (0–425° C.) | 94.1 | 93.5 | 93.5 | 94.6 | 93.3 |
| Transmission in millimicrons: thickness in inches | 1 | 1 | ½ | ½ | ½ |
| 365 | 2.2 | 3.0 | 14.1 | 26.3 | 29.2 |
| 404 | 47.3 | 55.4 | 64.9 | 76.5 | 78.1 |
| 430 | 65.3 | 72.2 | 76.2 | 82.1 | 82.2 |
| 546 | 81.4 | 82.3 | 84.2 | 84.9 | 85.4 |
| 656 | 81.4 | 81.9 | 84.1 | 84.7 | 85.3 |
| 1,014 | 84.4 | 84.4 | 85.1 | 85.7 | 86.1 |
| Index of refraction | 1.7722 | 1.7735 | 1.7761 | 1.7746 | 1.7745 |
| Melting temperature, °F | 2,550 | 2,600 | 2,550 | 2,650 | 2,650 |
| Melting time (hours) | 20 | 5½ | 20 | 7¼ | 7¼ |

The above-disclosed chemical and physical characteristics indicate that the subject glasses, generally essentially vitreous, have a fiber softening point of about 680 to 760° C., an annealing point of about 600 to about 670° C., a strain point of about 570 to about 640° C., a coefficient of thermal expansion of about 80 to about $100 \times 10^{-7}$ (0–425° C.) and a refractive index ($n_d$) of about 1.77 to about 1.90, which data appears to indicate the unexpected properties and unobvious qualities for the inventive glasses.

The novel optical glass compositions, when fabricated into rod form for cladding with an outer layer of a different glass, usually a borosilicate glass or a like glass or other suitable material, is cast or formed into rod form with a given external outside diameter that corresponds to the internal diameter of the cladding tubing. The cladding tubing with the fiber optic core billet positioned

TABLE IV.—THEORETICAL COMPOSITION

| | Percent by weight | | | | | | |
|---|---|---|---|---|---|---|---|
| Example | 9 | 10 | 11 | 12 | 13 | 14 | 15 |
| Ingredients: | | | | | | | |
| $SiO_2$ | 8.00 | 8.00 | 8.00 | 8.00 | 8.00 | 8.00 | 8.00 |
| $B_2O_3$ | 10.80 | 10.80 | 10.80 | 10.80 | 10.80 | 10.80 | 10.80 |
| CaO | 2.00 | | | | | 1.00 | 2.00 |
| BaO | 29.00 | 29.00 | 29.00 | 29.00 | 29.00 | 29.00 | 29.00 |
| $Ta_2O_5$ | 3.70 | 4.70 | 4.70 | 4.70 | 4.70 | 3.70 | 2.70 |
| $La_2O_3$ | 23.50 | 24.50 | 24.50 | 24.50 | 22.50 | 24.50 | 24.50 |
| $TiO_2$ | 12.00 | 12.00 | 11.10 | 12.00 | 12.00 | 12.00 | 12.00 |
| $ZrO_2$ | 5.00 | 8.00 | 8.00 | 3.00 | 5.00 | 5.00 | 8.00 |
| $Li_2O$ | | | 0.90 | | | | |
| $Nb_2O_3$ | 3.00 | 3.00 | 3.00 | 3.00 | 3.00 | 3.00 | 3.00 |
| $WO_3$ | 3.00 | | | 5.00 | 5.00 | 3.00 | |
| | Physical Properties | | | | | | |
| Fiber softening point, °C | 743 | 762 | 713 | 762 | 753 | 744 | 757 |
| Annealing point, °C | 654 | 661 | 622 | 654 | 656 | 656 | 664 |
| Strain point, °C | 629 | 643 | 595 | 627 | 630 | 627 | 636 |
| Index of refraction | 1.87 | 1.86 | 1.87 | 1.87 | 1.88 | 1.87 | 1.87 |

Glass compositions of the present invention were made into fiber optic core billets, and some of the fiber core billets were subsequently clad with a material of a lower index of refraction, said latter material being a borosilicate glass or the like or other suitable material. The cladded core billet was heated and drawn to reduce the diameter, and during and after this process the billet was essentially-free from devitrification. Next, the above product was reheated and redrawn to a smaller diameter. The reheating and redrawing steps can be repeated until the desired diameter for the fiber optic is obtained. The chemical and physical properties for an essentially vitreous fiber optic core glass made according to the present invention is set forth in the accompanying table, Table V.

therein is then heated and drawn into the desired fiber optic diameter. The cladding glass will have a refractive index which is lower than the optical core billet glass to perform successfully as a fiber optic system. The thermal expansion for the clad glass will usually be lower than the expansion of the subject glasses.

While the illustrative embodiments of the invention have been described with particularity, it will be understood that various modifications will be apparent and can readily be made by those skilled in the art without departing from the scope and spirit of the invention.

We claim:
1. An optical glass composition providing an index of refraction between about 1.77 and about 1.90 and consisting essentially of about 5 to about 15 weight percent $SiO_2$, about 7 to about 15 weight percent $B_2O_3$, about 0 to about 4 weight percent CaO, about 22 to about 30 weight percent BaO, about 2 to about 5 percent weight percent $Ta_2O_5$, about 18 to about 29 weight percent $La_2O_3$, about 8 to about 14 weight percent $TiO_2$, about 2 to about 9 weight percent $ZrO_2$, together with about 0 to about 4 weight percent $K_2O$, about 0 to about 4 weight percent $Na_2O$, about 0 to about 4 weight percent $Al_2O_3$, and about 0 to about 1 weight percent $Li_2O$.

2. A glass composition, according to claim 1 containing about 14 weight percent $SiO_2$, about 11 weight percent $B_2O_3$, about 2 weight percent CaO, about 29 weight percent BaO, about 3 weight percent $Ta_2O_5$, about 22 weight percent LaO, about 9 weight percent $TiO_2$, about 6 weight percent $ZrO_2$, about 1 weight percent $Al_2O_3$, about 0.2 weight percent $Li_2O$, and about 3 weight percent $K_2O$.

3. An optical glass composition consisting essentially of about 5 to about 15 weight percent $SiO_2$, about 7 to about 15 weight percent $B_2O_3$, about 0 to about 4 weight percent CaO, about 22 to about 30 weight percent BaO, about 2 to about 5 weight percent $Ta_2O_5$, about 18 to about 29 weight percent $La_2O_3$, about 8 to about 14 weight percent $TiO_2$, about 2 to about 9 weight percent $ZrO_2$, together with about 0 to about 4 weight percent $K_2O$, about 0 to about 4 weight percent $Na_2O$, about 0 to about 4 weight percent $Al_2O_3$, about 0 to about 1 weight percent $Li_2O$, about 1 to about 5 weight percent $Nb_2O_3$, and about 1 to about 10 weight percent $WO_3$.

4. An optical glass composition, according to claim 3, containing about 8 weight percent $SiO_2$, about 11 weight percent $B_2O_3$, about 2 weight percent CaO, about 29 weight percent BaO, about 4 weight percent $Ta_2O_5$, about 23 weight percent $La_2O_3$, about 12 weight percent $TiO_2$, about 5 weight percent $ZrO_2$, about 3 weight percent $Nb_2O_3$, and about 3 weight percent $WO_3$.

5. An optical glass composition, according to claim 3, containing about 8 weight percent $SiO_2$, about 11 weight percent $B_2O_3$, about 29 weight percent BaO, about 5 weight percent $Ta_2O_5$, about 24 weight percent $La_2O_3$, about 12 weight percent $TiO_2$, about 3 weight percent $ZrO_2$, about 5 weight percent $WO_3$, and about 3 weight percent $Nb_2O_3$.

6. An optical glass composition, according to claim 3, containing about 8 weight percent $SiO_2$, about 11 weight percent $B_2O_3$, about 1 weight percent CaO, about 29 weight percent BaO, about 4 weight percent $Ta_2O_5$, about 24 weight percent $La_2O_3$, about 12 weight percent $TiO_2$, about 5 weight percent $ZrO_2$, about 3 weight percent $Nb_2O_3$, and about 3 weight percent $WO_3$.

7. An optical glass composition consisting essentially of about 5 to 15 weight percent $SiO_2$, about 7 to about 15 weight percent $B_2O_3$, about 0 to about 4 weight percent CaO, about 22 to about 30 weight percent BaO, about 2 to about 5 weight percent $Ta_2O_5$, about 18 to about 29 weight percent $La_2O_3$, about 8 to about 14 weight percent $TiO_2$, about 2 to about 9 weight percent $ZrO_2$, together with about 0 to about 1 weight percent $Li_2O$, about 1 to about 5 weight percent $Nb_2O_5$, and about 0 to about 10 weight percent $WO_3$.

8. An optical glass composition, according to claim 7, containing about 8 weight percent $SiO_2$, about 11 weight percent $B_2O_3$, about 29 weight percent BaO, about 5 weight percent $Ta_2O_5$, about 24 weight percent $La_2O_3$, about 12 weight percent $TiO_2$, about 8 weight percent $ZrO_2$, and about 3 weight percent $Nb_2O_3$.

9. An optical glass composition, according to claim 7, containing about 8 weight percent $SiO_2$, about 11 weight percent $B_2O_3$, about 29 weight percent BaO, about 5 weight percent $Ta_2O_5$, about 24 weight percent $La_2O_3$, about 11 weight percent $TiO_2$, about 8 weight percent $ZrO_2$, and about 1 weight percent $Li_2O$ and about 3 weight percent $Nb_2O_3$.

10. An optical glass composition, according to claim 7, containing about 8 weight percent $SiO_2$, about 11 weight percent $B_2O_3$, about 2 weight percent CaO, about 29 weight percent BaO, about 3 weight percent $Ta_2O_5$, about 24 weight percent $La_2O_3$, about 12 weight percent $TiO_2$, about 8 weight percent $ZrO_2$, and about 3 weight percent $Nb_2O_3$.

References Cited
UNITED STATES PATENTS 2,576,521  11/1951  Kreidl et al. _____ 106—54

FOREIGN PATENTS 1,020,795  2/1966  Great Britain.
725,206    3/1955  Great Britain.
974,438    11/1964 Great Britain.

JAMES E. POER, Primary Examiner

UNITED STATES PATENT OFFICE
CERTIFICATE OF CORRECTION

PATENT NO. : 3,513,004
DATED : May 19, 1970
INVENTOR(S) : Jaroslaw Kohut, et al

It is certified that error appears in the above-identified patent and that said Letters Patent are hereby corrected as shown below:

Col. 4, line 27, after "commercially", delete hyphen "(-)".
Col. 5, Table 3, Ext. 7, $SiO_2$ Content "135.3" should be
--13.53--; Table 4, Ex. 10, under Annealing Point Physical
Properties "661" should be --671--. Col. 7, line 14, "LaO"
should be --$La_2O_3$--.

$\mathfrak{Signed}$ and $\mathfrak{Sealed}$ this twenty-seventh Day of January 1976

[SEAL]

Attest:

RUTH C. MASON
*Attesting Officer*

C. MARSHALL DANN
*Commissioner of Patents and Trademarks*